Dec. 7, 1965  C. M. ANDERSON  3,221,865
MATERIAL HANDLING APPARATUS
Filed April 20, 1964  3 Sheets-Sheet 3
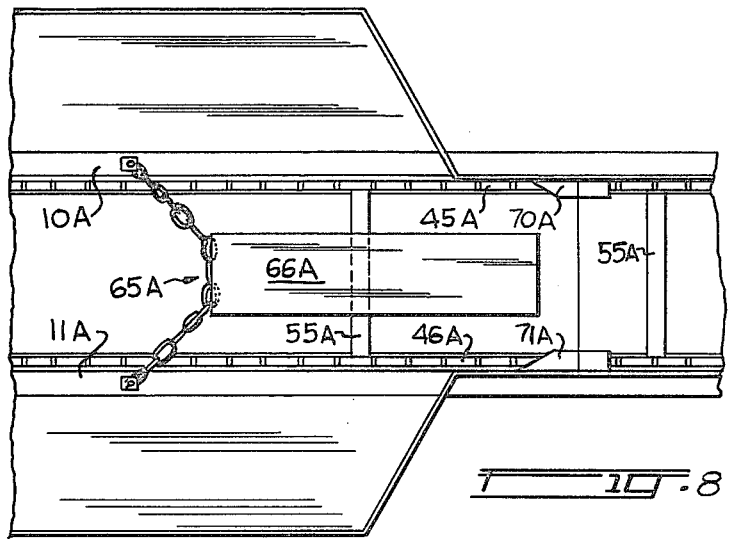
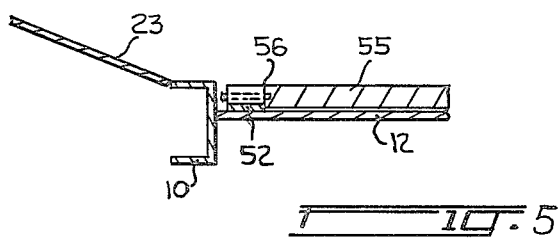
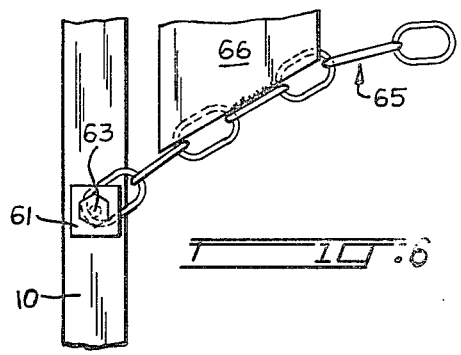
INVENTOR
CHARLES M. ANDERSON
BY  W. E. Sherwood
ATTORNEY

United States Patent Office 3,221,865
Patented Dec. 7, 1965

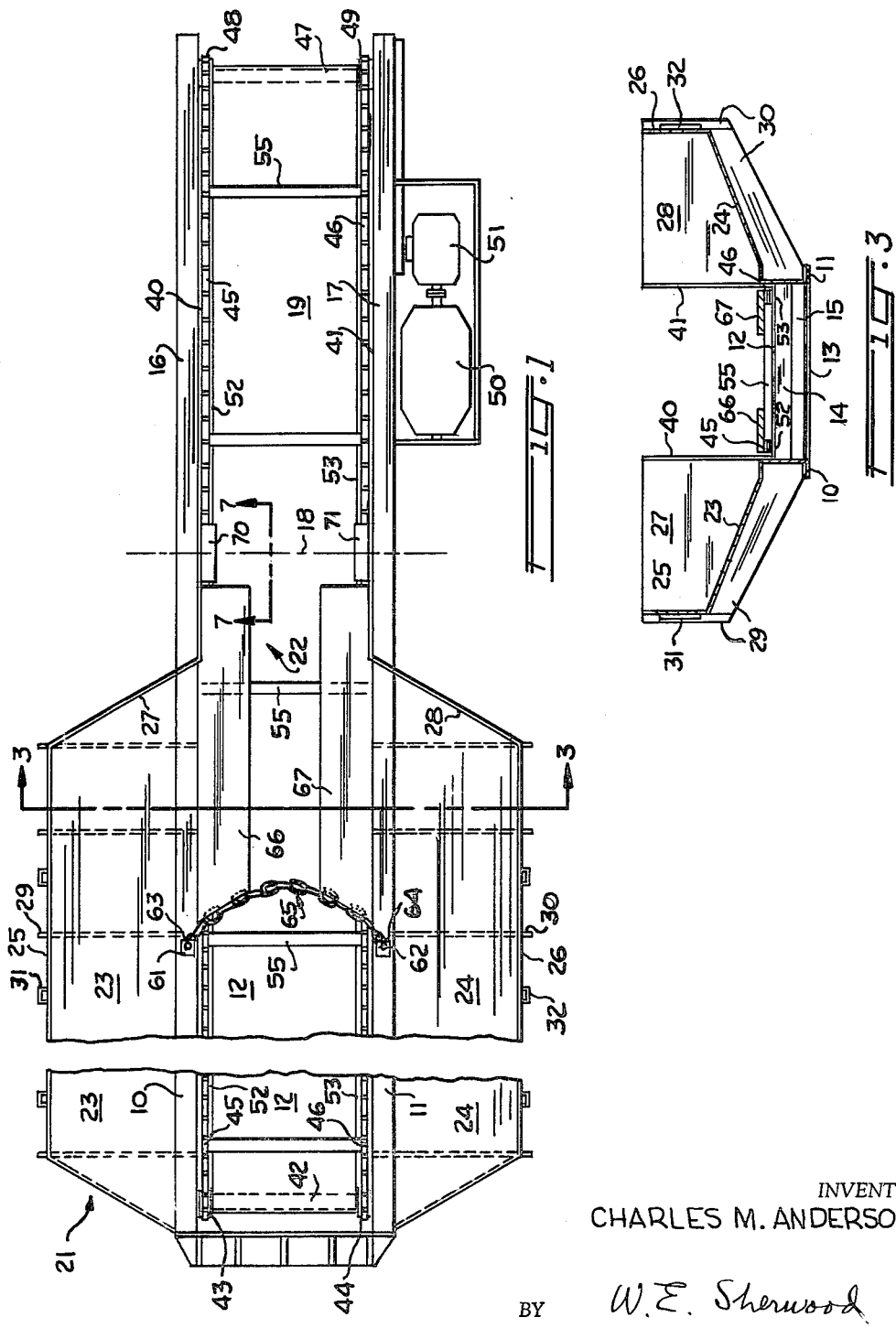

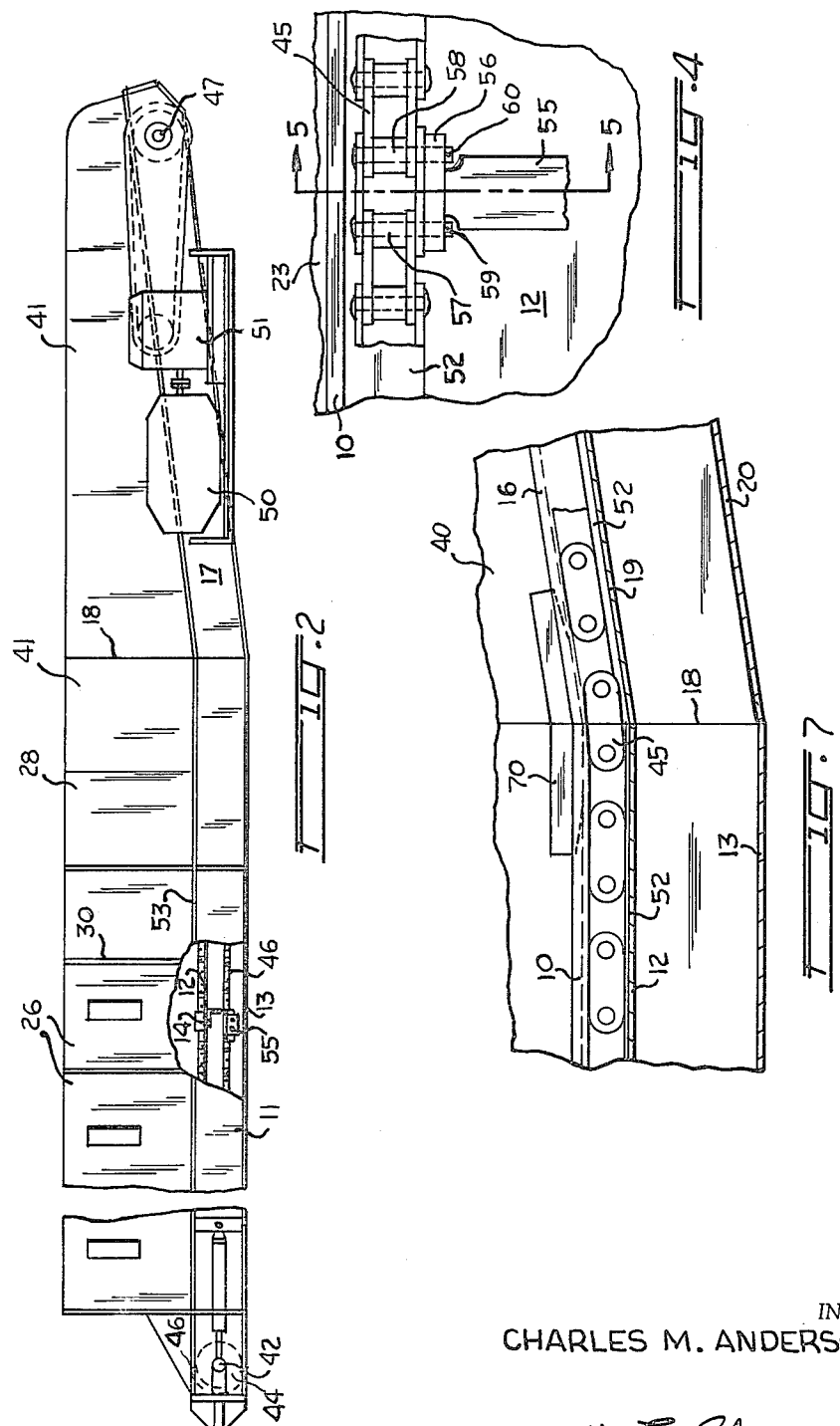

3,221,865
MATERIAL HANDLING APPARATUS
Charles M. Anderson, Paris, Ky., assignor to W. R. Stamler Corporation, Paris, Ky., a corporation of Kentucky
Filed Apr. 20, 1964, Ser. No. 361,139
7 Claims. (Cl. 198—53)

This invention relates to an improved apparatus for the handling of materials, such as coal or the like, and wherein a substantially uniform rate of discharge is required even when the material is delivered to the apparatus rapidly in large batches.

Equipment of this general type employing the combination of a wide hopper portion for receiving the load of material quickly, a narrow delivery chute portion for discharging the material, a conveyor movable along the floors of the hopper and delivery chute and urging the material from the hopper into the chute, and means for preventing the spilling of the material from the apparatus as it moves from the hopper into the chute, is well known. However, the compaction of the material as it moves from the hopper into the narrower delivery chute frequently imposes a heavy loading on the conveyor flights and driving mechanism and particularly when lumps of material become locked between a moving conveyor flight and a stationary part of the apparatus. It is a purpose of the present invention to reduce substantially, if not to eliminate entirely, that disadvantage as found in conventional equipment for handling of such material. Although the invention is particularly well suited for handling of discrete, random-sized materials such as rock, ore or coal, it also in its broader aspects is adapted for handling granular material.

An object of the invention is to provide an improved material handling apparatus employing a flight type of conveyor for discharging material therefrom and having means for relieving the conveyor from excessive stresses as the material is conveyed past the choke station of the apparatus.

Another object is to provide an improved floating, load-control means for use with flight conveyors in material-handling apparatus.

Other objects and advantages of the invention will become more apparent as the description proceeds and when considered in conjunction with the accompanying drawings in which FIG. 1 is a top plan view of a machine embodying one form of the invention.

FIG. 2 is a side elevation of the machine with parts broken away.

FIG. 3 is a sectional view taken on line 3—3 of FIG. 1.

FIG. 4 is a detail view of a larger scale showing the attachment of one end of a flight to the conveyor chain.

FIG. 5 is a sectional view taken on line 5—5 of FIG. 4.

FIG. 6 is a plan view showing the attachment of an end link of the floating-plate articulated chain to a beam of the machine framework and the attachment of other links to the floating load-control structure.

FIG. 7 is a sectional view taken on line 7—7 of FIG. 1, and

FIG. 8 is a top plan view of the choke region of the apparatus showing a second embodiment of the invention.

Referring first to FIGS. 1 and 2, the apparatus may conveniently comprise a simple rigid framework including a pair of elongated, parallel channel shaped beams 10 and 11 whose upper surfaces are exposed to the material being handled and whose lower surfaces rest upon the ground. Attached to the beams as by welding, is a floor member 12 disposed beneath the plane of those upper beam surfaces, and spaced below the floor member is a shield 13, attached to the beams and serving to protect the return travel of the conveyor flights as best seen in FIG. 2. A plurality of braces 14, such as angle-iron members, are affixed at their ends to the confronting sides of the beams in spaced relation along the beams beneath the floor member, and the space 15 beneath these braces provides room for the return travel of the conveyor. The apparatus may be constructed to move the material without lifting of the same, but in a preferred form I provide for discharging the material from a raised position. In this arrangement as herein shown, complementary beam members 16 and 17 disposed at an angle to the horizontal, form prolongations of the respective beams 10 and 11 extending rearwardly from the junction plane 18. An inclined floor 19 and an inclined bottom shield 20 likewise form prolongations of the floor 12 and shield 13 extending rearwardly from that same junction plane.

The apparatus includes a capacious hopper portion having an inlet end and an exit end generally indicated at 21 and 22 respectively. This hopper portion is defined by upwardly inclined sheet metal members 23 and 24 affixed at their lower edges to the upper flanges of the respective beams 10 and 11 and treminating in generally vertical side walls 25 and 26. At their rearward ends the walls 25 and 26 merge into generally vertical, rearwardly directed wall portions 27 and 28 serving as "throttling boards" and extending to the generally rectangular-shaped exit end of the hopper structure as best seen in FIG. 3. Reinforcing gussets 29 and 30 are attached to the outer surfaces of the respective beams 10, 11; respective members 23, 24 and respective vertical wall portions 25 and 26, and brackets 31 and 32 may also be provided for receiving stakes of additional hopper side members (not shown) when even greater hopper capacity is desired.

Attached to the rearward ends of the throttling boards 27, 28 and to the upper surfaces of the beams 16 and 17 is a pair of parallel vertically disposed walls 40, 41 serving in conjunction with the floor 19 to define a delivery chute portion of the apparatus. As will now be apparent, the cross-sectional areas of the hopper portion in advance of its exit end 22 is much greater than the cross-sectional area of the chute portion with the result that material approaching the entrance to the chute portion enters a region which conveniently may be defined as the "choke" region of the apparatus and at which excessive loadings on the conveyor and spillage of material from the apparatus may ensue unless precautions are taken to avoid the same. The present invention provides a solution to this problem by means of a novel floating, load-control plate structure acting in conjunction with the conveyor, now to be described, and which structure is arranged at this choke region of the apparatus.

The conveyor includes a tail shaft 42 suitably mounted at the forward ends of the beams 10 and 11 and carrying a pair of sprockets 43, 44 over which a pair of endless conveyor chains 45, 46 are trained. In addition, there is provided a head shaft 47 suitably mounted at the rear ends of beams 16 and 17 and carrying a pair of sprockets 48, 49 around which the conveyor chains are trained. The head shaft is driven by a motor 50 through a conventional speed reducer 51. The respective conveyor chains are adapted to ride along a pair of wear strips 52 and 53 affixed to the floor members 12 and 19 inboard of the respective beams 10, 16 and 11, 17. These wear strips, which may be metal, are of sufficient height to dispose the tops of the conveyor chains and the conveyor flights 55 slightly below the plane of the top surfaces of the beams 10, 16 and 11, 17 and to permit the bottoms of the flights to remain out of dragging contact with the floor members. As best shown in FIGS. 4 and 5, each conveyor flight 55 comprises a rigid member affixed at its ends to mounting blocks, one of which is seen at 56 and having suitably spaced holes for reception of a pair of special conveyor link pins 57 and 58, these pins being held in place by suitable retainers, such as cotter pins 59 and 60. The flights extend transversely of the floor members of the apparatus and preferably are spaced equidistant from each other.

With the foregoing in mind, reference now is made to FIGS. 1 and 6 showing a major feature of the invention. Securely affixed to the top surface of beams 10 and 11 are hollow anchor blocks 61 and 62 with vertical bolts 63 and 64 extending therethrough. Extending from these blocks and anchored at the ends to these bolts is a flexible articulated means such as a chain 65 the length of which is greater than the distance between the anchoing blocks. As an example, a ⅝" BBB steel chain may be satisfactorily employed when handling material such as coal. With the exception of the extreme end links and those links adjacent thereto, the remaining central links of chain 65 are disposed in the path of travel of the conveyor flights and receive therefrom a bouncing movement as each flight moves under the chain and lifts the chain. This bouncing movement in turn is imparted to one or more elongated flat plates 66 and 67 attached as by welding at their upstream ends to intermediate links of chain 65 as best indicated in FIG 6. These plates preferably are of substantial length, for example, about six feet, and their vibration accordingly is transmitted through a large mass of material at the exit end of the hopper. The downstream ends of these plates are disposed within the delivery chute portion of the apparatus and the upstream ends are located forwardly of the choke region so that the presence of the plates exerts a load control on the capacity of the conveyor as material is moved from the hopper portion into the chute portion. A plurality of the central links of chain 65 are not attached to either of plates 66 and 67 and these central links provide sufficient slack to permit plates 66 and 67 to move toward and from each other as dictated by the presence of material between and above the respective plates. Furthermore, since each plate rests loosely upon the tops of the conveyor flights passing therebeneath, the plates may rise or lower independently of each other as when large lumps of material are being moved by a conveyor flight into contact with a plate. As is known, the presence of plates 66 and 67 diminishes the exposed area of the floor 12 at the choke region of the apparatus and reduces the effective grip of the conveyor flights upon the load mass which is located in this choke regon. Thus, regardless of the amount of material which may be piled about the wall portions 27 and 28 and above the plates 66 and 67, the flights will move material into the chute portion at a substantially uniform rate. Having once passed into the chute, the material preferably should disperse over the entire width of floor 19 in preparation for its discharge from the apparatus, and the downstream ends of the floating plates are located sufficiently far from the ends of walls 40 and 41 to insure a proper dispersion. Conveniently, these downstream ends of the plates are located forwardly of the junction plane 18 particularly when an inclined floor 19 is used.

As shown in FIG. 7 means are provided to assist in holding the conveyor chains 45 and 46 at all times in contact with the wear strips. The loading of the material upon those conveyor chains likewise serves this purpose, but when the apparatus employs an upwardly directed chute portion, guide shoes 70 and 71 suitably affixed to beams 16 and 17 preferably are employed at the junction plane 18. The undersurfaces of these shoes are suitably contoured to guide the upper sides of the conveyor chains passing thereunder. The fixed guide shoes, which comprise the only fixed obstruction overlying any floor area of the apparatus, are shielded on their upstream sides by the floating plates and thus the likelihood of a hard lump of material being trapped between a conveyor flight and one of the guide shoes is obviated.

Other modifications may be employed without departing from the invention and as shown in FIG. 8, a chain 65A anchored as above described to beams 10A and 11A has affixed to its central links a single floating plate 66A which covers the central area of the floor in the choke region and floats upon the conveyor flights 55A. In this arrangement, the guide shoes 70A and 71A for the conveyor chains 45A and 46A are beveled on their upstream sides to diminish the likelihood of a lump of material being trapped thereagainst.

As will be understood, other forms of flexible means for holding a floating load-control plate or plates in proper position may be used, as, for example, rope, cable and the like. Essentially such a means must be capable of preventing the displacement of the plate downstream by movement of the flights and at the same time permitting the plate to move vertically or transversely.

The machine employing the invention may be equipped with wheels (not shown) for use in moving the machine to various locations.

Numerous advantages of the invention will be apparent to those skilled in the art, among which the following may be noted. Since the floating plates are affixed to a flexible means which is anchored to the main beams rather than to a wall of the hopper, comparatively light weight wall materials may be used in the apparatus; the conveyor flights pass above the floor structure and less wear of the parts takes place and without detracting from the conveying ability of the apparatus; no fixed obstructions to the passage of material from the extreme inlet end to the extreme outlet end of the apparatus are present; due to the sloping walls of the hopper and to the vibration of the floating plates, no material will have to be cleaned from the plates when the conveyor comes to rest; and the floating plates have their downstream ends so located as to permit dispersion of the material before it reaches the discharge end of the chute.

Having thus described the invention, it will be understood that the modifications above shown are for purposes of illustrations and that the invention may be further modified and embodied in various other forms without departing from its spirit or from the scope of the appended claims.

What I claim as new and desire to secure by Letters Patent is:

1. Material handling apparatus for receiving uneven loadings of material and for delivering the same at a substantially uniform rate of discharge and comprising, a hopper portion having opposite side walls spaced relatively far apart at the intake end of said apparatus and merging into a hopper exit end having side walls spaced relatively close together and forming a choke region of said apparatus, a delivery chute portion having side walls extending from said choke region and receiving material conveyed past said hopper exit end, a floor for said hopper and chute portions, a conveyor including transversely disposed flights spaced from each other and movable along said floor adjacent thereto so as to gather material in said hopper portion, convey it past said choke region and deliver it into and from said chute portion, a floating plate structure serving as a load flow control member and resting upon said flights, and a flexible means anchored at its ends to said hopper portion and connected intermediate its ends to said plate structure at the upstream end thereof and serving jointly to prevent displacement of said plate structure downstream by the movement of said flights and to permit said plate structure to move vertically and transversely within said hopper exit and during movement of said flights, said plate structure being disposed at a location within said apparatus at which it covers a substantial portion of said conveyor at the choke region of said apparatus and none of the conveyor adjacent the intake end of said hopper portion, 2. Apparatus as defined in claim 1 wherein said plate structure comprises a pair of flat plates spaced from each other and separately connected at their upstream ends to said flexible means.

3. Apparatus as defined in claim 1 wherein said plate structure comprises a single flat plate arranged along the longitudinal center line of said hopper and chute portions and having a width less than the distance between the side walls of said chute portion.

4. Material handling apparatus of the type described and comprising, a pair of elongated parallel beams, a floor supported between said beams, a hopper supported by said beams at the intake end of said apparatus, a delivery chute supported by said beams at the outlet end of said apparatus, said chute having side walls spaced relatively close together and said hopper having side walls spaced relatively far apart and merging inwardly into connection with the forward ends of said chute walls, thereby to form a choke region of said apparatus, an endless conveyor mounted upon said beams and having flights disposed transversely of said floor and movable along said floor adjacent thereto so as to gather material in said hopper, convey it past said choke region and deliver it into and from said chute; a flexible means having a length greater than the width of said floor and anchored at its ends to the respective beams adjacent said floor and upstream of said choke region, and a floating plate structure serving as a load flow control member and resting upon said flights, said plate structure being attached at its upstream end to said flexible means and extending into said chute and covering a substantial portion of said conveyor in said choke region, said plate structure being adapted to move vertically and transversely of said hopper and said chute.

5. Apparatus as defined in claim 4 wherein the downstream end of said plate structure terminates at a sufficient distance from the discharge end of said chute to permit material in said chute to disperse transversely of said floor prior to its discharge from said chute.

6. Apparatus as defined in claim 4 wherein said flexible means comprises a chain having its end links attached to said beams and a plurality of its intermediate links attached to said floating plate structure.

7. Material handling apparatus of the type described and comprising a pair of elongated parallel beams, a floor supported between said beams at an elevation beneath the top surfaces of said beams, a pair of wear strips attached to the upper surface of said floor adjacent the respective beams and parallel thereto, a hopper supported by said beams at the intake end of said apparatus, a delivery chute supported by said beams at the outlet end of said apparatus, said chute having side walls spaced relatively close together and said hopper having side walls spaced relatively far apart and merging inwardly into connection with the forward ends of said chute walls thereby to form a choke region of said apparatus, an endless conveyor mounted on said beams and including a pair of conveyor chains adapted to ride along the respective wear strips, said conveyor having flights connected to said conveyor chains and extending transversely of said floor and with the lower surfaces of said flights disposed above said floor during movement of said flights through said hopper and chute; a floating plate structure resting upon said flights and extending into said chute and covering a substantial portion of said conveyor in said choke region, and a flexible means attached to the upstream end of said plate structure and anchored at its ends to the top surfaces of the respective beams upstream of said choke region, said flexible means having a length greater than the width of said floor thereby to permit flights passing under the sagging central portion of said flexible means to strike the same and to transmit vibration to said floating plate structure being adapted to move vertically and transversely of said hopper and said chute.

References Cited by the Examiner
UNITED STATES PATENTS

| | | | |
|---|---|---|---|
| 1,375,988 | 4/1921 | Walker | 198—52 |
| 3,071,238 | 1/1963 | Schreyer | 198—53 |

SAMUEL F. COLEMAN, *Primary Examiner.*

RICHARD E. AEGERTER, *Examiner.*